No. 876,272. PATENTED JAN. 7, 1908.
E. J. GULICK.
MEANS FOR FLEXIBLY CONNECTING PARTS OF A VEHICLE TO A FRAME.
APPLICATION FILED FEB. 21, 1907.
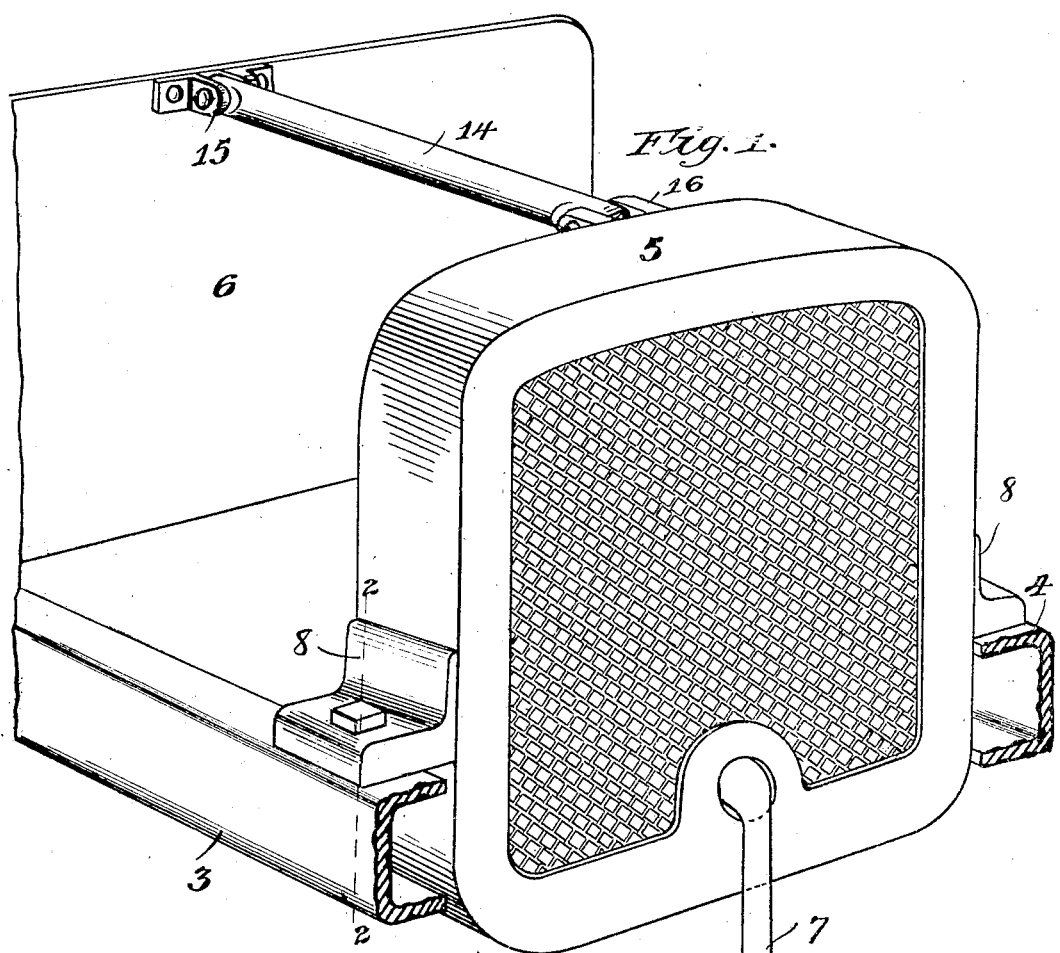
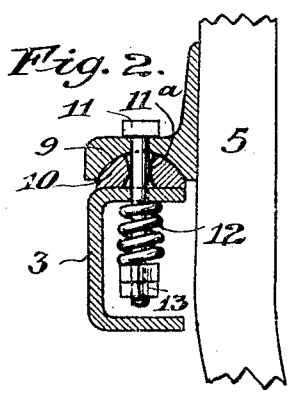

UNITED STATES PATENT OFFICE.

EDWARD J. GULICK, OF MISHAWAKA, INDIANA

MEANS FOR FLEXIBLY CONNECTING PARTS OF A VEHICLE TO A FRAME.

No. 876,272.     Specification of Letters Patent.     Patented Jan. 7, 1908.

Application filed February 21, 1907. Serial No. 358,712.

*To all whom it may concern:*

Be it known that I, EDWARD J. GULICK, a citizen of the United States, residing at Mishawaka, in the county of St. Joseph and State of Indiana, have invented certain new and useful Improvements in Means for Flexibly Securing Parts of a Vehicle to the Vehicle-Frame, of which the following is a specification.

The invention consists broadly in a flexible connection between a vehicle frame and a part supported thereon, and is designed more especially for the attachment of a radiator for a motor vehicle to the vehicle frame. The radiator of a motor vehicle is generally placed at the extreme front end of the vehicle frame and is rigidly secured thereto. This construction is faulty in that when the ground contacting points of the four wheels of the vehicle do not lie in the same plane, as for instance, when a wheel encounters an obstacle in the roadway that raises it above the other wheels, there is an unequal movement between the side bars of the frame which results in a strain exerted upon the radiator where it is attached to the frame, which strain or twisting action results in injury to the radiator and necessitates frequent repairs.

The main object of my invention therefore is to provide a flexible connection between the frame and the part to be supported whereby one side of the frame may be bent or sprung from the normal plane of the frame and not result in injury to a part supported thereon and secured thereto.

In the accompanying drawing Figure 1 is a perspective elevation of a vehicle frame with a radiator secured thereto; and Fig. 2 is a sectional end elevation on line 2—2 of Fig. 1, with the radiator broken away.

Referring now more particularly to the drawing, 3 and 4 represent the side bars of a vehicle frame of channel form, as shown, and 5 represents as a whole a radiator; 6 being the dash of the vehicle, and 7 the crank handle for the same, the parts mentioned being of the ordinary construction. To the opposite vertical edges of the radiator are secured the brackets 8, by any well known means such as soldering, bolts or the like, the brackets having in the under side thereof the socket member 9 of a ball and socket joint. Upon the frame and rigidly secured thereto in any well known manner is the ball member 10, of the ball and socket joint, and passing through the bracket 8 and ball 10 is the bolt 11 which extends into the channel frame-bar and carries the spring 12 which is held between the under side of the frame-bar and the end of the bolt 11 by means of the nuts 13. It is understood that the bolt 11 has a sliding movement through the bracket 8, ball joint 10 and the frame-bar, which are all suitably apertured to receive the same. In order to provide for the necessary degree of universal movement at the ball and socket joint, the apertures which accommodate the bolt 11 are somewhat enlarged transversely and preferably flared at the ends, as shown at 11ª.

The radiator is provided on either edge with a construction as just described which is secured to either side of the frame, and the tension of the spring 12 is sufficient to yieldingly hold the radiator in its proper position. As a further means for securing the radiator and to keep it in its proper place I provide a spacer or pivot bar 14 that is loosely pivoted to the dash, as shown at 15, as well as loosely pivoted to the radiator, as shown at 16, which pivot bar maintains the radiator in its proper vertical position.

When an obstacle is encountered in the roadway by one of the wheels, let us assume it to be the rear wheel on the side frame 3, the frame 3 would be raised at its rear end, which would tend to lower the end at which the radiator is attached thereto. This would throw the side bars 3 and 4 slightly out of parallelism and if it were not for the construction herein shown it would result in a strain coming upon the brackets 8 where they are attached to the radiator and thereby tend to pull them therefrom, but in the present construction the side bar 3 would tend to compress the spring 12 slightly moving the ball 10 within the socket 9 and thereby avoid throwing any strain upon the bracket where it is attached to the radiator, as well as upon the radiator itself. The bracket on the side bar 4 would operate in the same manner as just described if an obstacle was encountered by the rear wheel on the side bar 4; and the same action would take place where an obstacle was met by either of the front wheels.

I do not limit my invention to the construction herein shown, that is, as a means for securing a radiator alone to the vehicle frame, but the device may be used with equal efficiency upon any part of the vehicle that it is necessary to secure to the frame, nor do I limit myself to the precise construction shown for making the flexible connection, and therefore without confining myself to the specific details I claim:

1. In combination with a frame member, and a supported member, of a socket on one of said members and a ball on the other member to constitute a ball and socket joint, a bolt extending through said members, and a spring surrounding the lower end of the shank of said bolt and secured beneath said frame member, whereby said frame and supported members are yieldingly secured together, substantially as described 2. In a motor vehicle, in combination, a frame member and a radiator member supported by said frame member, of a socket on one of said members and a ball on the other member to constitute a ball and socket joint, a bolt extending through said ball and socket joint, a spring surrounding the lower end of the shank of said bolt and secured beneath said frame member whereby said frame and radiator are yieldingly secured together, and a pivot bar connected to said radiator and to a support on said vehicle to hold said radiator in its proper vertical position, substantially as described.

EDWARD J. GULICK.

Witnesses:
L. F. MAURER,
GEORGE W. HOYT.